United States Patent [19]

Iwahara et al.

[11] Patent Number: 4,904,732
[45] Date of Patent: Feb. 27, 1990

[54] CURABLE ISOBUTYLENE POLYMER

[75] Inventors: Takahisa Iwahara, Hirakata; Koji Noda; Katsuhiko Isayama, both of Kobe, all of Japan

[73] Assignee: Kanegafuchi Kagaku Kogyo Kabushiki Kaisha, Osaka, Japan

[21] Appl. No.: 65,550

[22] Filed: Jun. 24, 1987

[30] Foreign Application Priority Data

Jun. 25, 1986 [JP] Japan .................................. 61-148895
Jun. 26, 1986 [JP] Japan .................................. 61-150088

[51] Int. Cl.$^4$ ............................................. C08F 8/00
[52] U.S. Cl. .................................... 525/100; 525/101; 525/288
[58] Field of Search ......................... 525/100, 101, 288

[56] References Cited

U.S. PATENT DOCUMENTS

| 3,644,315 | 2/1972 | Fanwood et al. | 260/85.3 |
| 3,971,751 | 7/1976 | Isayama et al. | 260/37 |
| 4,276,394 | 6/1981 | Kennedy et al. | 525/245 |
| 4,657,986 | 4/1987 | Isayama et al. | 525/101 |
| 4,665,127 | 5/1987 | Hirose et al. | 525/101 |

FOREIGN PATENT DOCUMENTS

| 423881 | 3/1968 | Australia . |
| 1357549 | 6/1974 | United Kingdom . |
| 2110706A | 6/1983 | United Kingdom . |

Primary Examiner—Joseph L. Schofer
Assistant Examiner—Bernard Lipman
Attorney, Agent, or Firm—Armstrong, Nikaido, Marmelstein, Kubovcik & Murray

[57] ABSTRACT

An isobutylene polymer having at least one silicon-containing group cross-linkable by the formation of a siloxane bond. The isobutylene polymer is a novel polymer curable at ordinary temperature and has not only excellent weatherability, water-resistance and heat-resistance but also excellent electric isolation and gas impermeability.

12 Claims, No Drawings

CURABLE ISOBUTYLENE POLYMER

BACKGROUND OF THE INVENTION

The present invention relates to an isobutylene polymer containing at least one silicon-containing group cross-linkable by the formation of a siloxane bond (hereinafter referred to as "cross-linkable silicon group"), a curable composition containing the same, and a cured product thereof.

An organic rubber polymer having a cross-linkable silicon group is an organic polymer having a silicon-containing group cross-linkable by forming a siloxane bond, and has such an interesting property as it is cured even at ordinary temperature to form a rubber-like elastomer, as shown in the following formula.

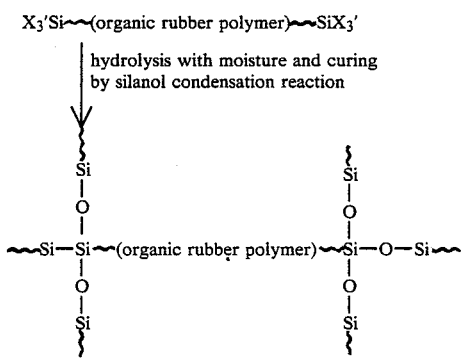

wherein X' is a hydrolyzable group

The above polymer has a similar curing property to that of a room temperature-vulcanizable polysiloxane Moreover, it can have properties that the polysiloxane does not have since its main chain is not a polysiloxane but an organic polymer. As the organic polymer having a cross-linkable silicon group, a polyether having cross-linkable silicon group is disclosed in U.S. Pat. No. 3,971,751. However, its properties such as weatherability, water-resistance and heat-resistance are not sufficient and, therefore, the polyether is sometimes restricted in its use.

An object of the present invention is to provide a novel polymer having a cross-linkable silicon group with excellent weatherability, water-resistance and heat-resistance, a composition containing the same, and the cured product thereof.

The above and other objects of the present invention will become apparent from the description hereinafter.

SUMMARY OF THE INVENTION

According to the present invention, there is provided an isobutylene polymer having at least one silicon-containing group cross-linkable by the formation of a siloxane bond. The isobutylene polymer is a novel polymer curable at ordinary temperature and having not only excellent weatherability, water-resistance and heat-resistance but also excellent electric isolation and gas impermeability.

DETAILED DESCRIPTION

The isobutylene polymer having a cross-linkable silicon group of the present invention has a main chain mainly composed of isobutylene monomer units. Though a polymer having a main chain which is substantially composed of only isobutylene monomer units is usually employed, an isobutylene copolymer can be also employed. In case of employing the copolymer, a copolymer having at least 50% by weight of isobutylene monomer units is preferred, and more preferably at least 70% by weight. Such a polymer can be prepared by cationic polymerization of monomers including isobutylene monomers as a main component. As the monomer to be copolymerized, there are exemplified, for instance, a cationic polymerizable olefin having 4 to 12 carbon atoms, a conjugated diene, a vinyl ether, an aromatic vinyl compound, a vinylsilane, an allylsilane, and the like. Examples of the copolymerizable monomers are, for instance, 1-butene, 2-butene, 2-methyl-1-butene, 3-methyl-1-butene, pentene, 4-methyl-1-pentene, hexene, vinylcyclohexane, butadiene, isoprene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane, and the like. In the cationic polymerization, an acid such as $H_2SO_4$ or $CCl_3CO_2H$, or a Friedel-Crafts catalyst such as $SnCl_4$ or $TiCl_4$ can be employed as a polymerization initiator. Also, it is preferable to carry out the polymerization by means of Inifer method by which a polymer having functional groups at the molecular ends can be prepared. The Inifer method disclosed in U.S. Pat. No. 4,276,394 is a method for cationic polymerization in which, as a polymerization initiator, an organic halogen compound capable of producing a stable carbonium cation is employed in combination with a Friedel-Crafts catalyst such as $BCl_3$, $SnCl_4$, $TiCl_4$, $SbCl_6$, $FeCl_3$ or $AlCl_3$. The above-mentioned organic halogen compound has such a structure as

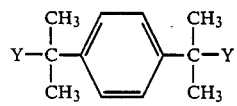

(wherein Y is a halogen atom),

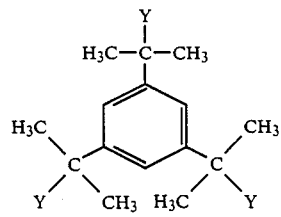

(wherein Y is as defined above),

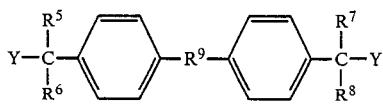

(wherein $R^5$, $R^6$, $R^7$ and $R^8$ are the same or different, and each is hydrogen atom, a lower alkyl group having 1 to 20 carbon atoms or phenyl group, $R^9$ is a bivalent hydrocarbon group having 1 to 20 carbon atoms and Y is as defined above) or

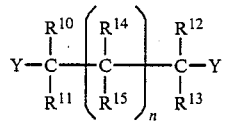

(wherein $R^{10}$, $R^{11}$, $R^{12}$ and $R^{13}$ are the same or different, and each is a monovalent hydrocarbon having 1 to 20 carbon atoms, $R^{14}$ and $R^{15}$ are the same or different, and each is a hydrogen atom, a hydrocarbon group having 1 to 20 carbon atoms or a halogen atom, provided that when either one of $R^{14}$ and $R^{15}$ is a halogen atom, the other is not a halogen atom or hydrogen atom; Y is as defined above, and n is 0 or an integer from 1 to 20). Examples of such compounds are, for instance,

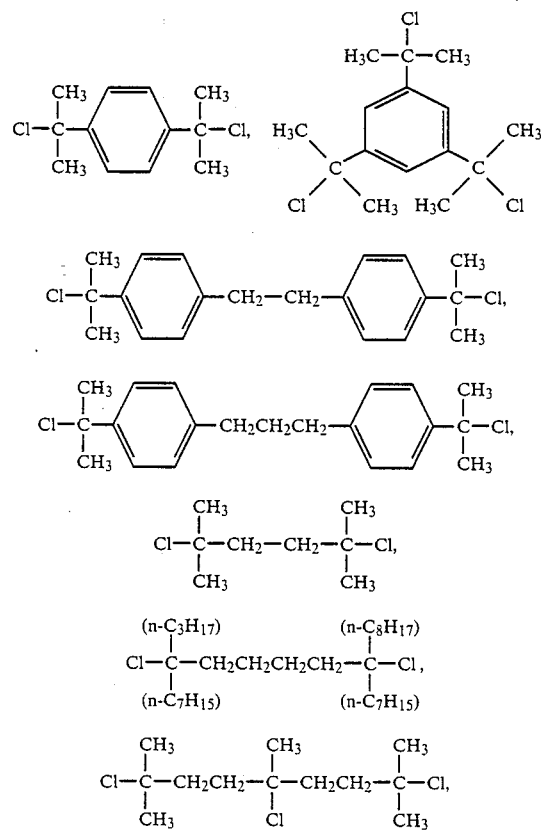

and the like.

In the Inifer method, the polymerization of the above-mentioned cation-polymerizable monomers is carried out at a temperature from $-130°$ to $+10°$ C. in a saturated hydrocarbon solvent such as ethane, propane, butane, pentane or hexane; a halogenated hydrocarbon solvent such as methyl chloride, methylene chloride or 1,1-dichloroethane; or a mixture thereof to give a polymer having, at the polymer ends, a halogen atom derived from the above-mentioned organic halogen compound.

For example, a polymer having the groups of the formula:

at both molecular ends can be prepared by polymerizing isobutylene monomers at $-70°$ C. in methylene chloride, using

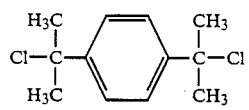

with $BCl_3$ as the polymerization initiator. Further, the obtained polymer can be converted into an isobutylene polymer having the group of the formula:

at both molecular ends by selectively eliminating HCl with a strong base such as potassium t-botoxide (t-BuOK). The obtained isobutylene polymer can be suitably employed in a hydrosilylation as described later.

In the invention, as the cross-linkable silicon group, there is exemplified a cross-linkable silicon-containing group, having a hydroxyl group or a hydrolyzable group bonded to a silicon atom. A typical example of the cross-linkable silicon group is the group represented by the formula (1):

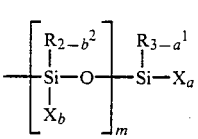 (1)

wherein $R^1$ and $R^2$ are the same or different and each is a member selected from the group consisting of an alkyl group having 1 to 20 carbon atoms, an aryl group having 6 to 20 carbon atoms, an aralkyl group having 7 to 20 carbon atoms and a triorganosiloxy group having the formula (7):

$(R')_3SiO-$ (7)

in which each R' is independently a monovalent hydrocarbon group having 1 to 20 carbon atoms; X is a hydroxyl group or a hydrolyzable group, and when more than one X is present, the X groups are the same or different; a is 0, 1, 2 or 3, b is 0, 1 or 2, provided that sum of a and b is 1 or more; m is 0 or an integer of 1 to 18. Among the groups represented by the formula (1), a group having the formula:

wherein $R^1$, X and a are as defined above is preferable.

Examples of the group X are hydrolyzable groups used in general such as a hydrogen atom, an alkoxyl group, an acyloxyl group, a ketoxymate group, an amino group, an amido group, an aminoxy group, a mercapto group, and an alkenyloxy group, and the like. Among the hydrolyzable groups, the alkoxyl group is especially preferred in that the hydrolyzability is adequate and handling is easy. One to three groups X can bond to one silicon atom and when more than one X is present, the groups X are the same or different.

The number of silicon atoms in the cross-linkable silicon group may be one or more. In case of silicon atoms bonded by siloxane bond, cross-linkable silicon groups with at most 20 silicon atoms are preferable.

The isobutylene polymer must have at least one, preferably 1.2 to 4 cross-linkable silicon groups in its molecule. When the number of the cross-linkable silicon groups included in the molecule is less than 1, the curability tends to be insufficient. Further, in case that a telechelic polymer is desired, it is preferable that the cross-linkable silicon group exists at the molecular ends in the isobutylene polymer.

When the cross-linkable silicon group exists at the molecular ends, a rubber-like cured product having a excellent strength and a high elongation can be obtained easily because of maximizing the chain length between cross-linking sites in the cured product.

Methods for introducing the cross-linkable silicon group into the isobutylene polymer are not limited, and the following methods are effectively employed. That is, a silicon hydride compound having the formula (3):

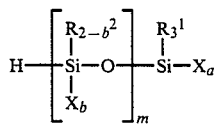

(3)

wherein $R^1$, $R^2$, X, a, b and m are as defined above, is introduced into an isobutylene polymer having at least one unsaturated group represented by the formula (2):

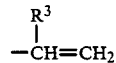

(2)

wherein $R^3$ is hydrogen atom, an alkyl group having 1 to 8 carbon atoms, an aryl group having 6 to 20 carbon atoms or an aralkyl group having 7 to 20 carbon atoms, by so-called hydrosilylation in the presence of a catalyst. Examples of the catalyst mentioned above are, for instance, $H_2PtCl_6 \cdot 6H_2O$, a compound of

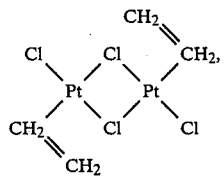

platinum metals, $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and the like.

According to the above hydrosilylation, the polymer having a cross-linkable silicon group represented by the formula (4):

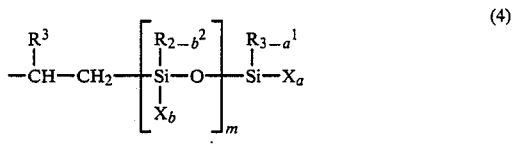

(4)

wherein $R^1$, $R^2$, $R^3$, X, a, b and m are as defined above, is obtained.

The hydrosilylation is generally carried out at a temperature of 0° to 150° C. As occasion demands, a solvent such as n-pentane, n-hexane, n-heptane, benzene, toluene or xylene may be used for controlling the reaction temperature or the viscosity of the reaction system.

Another method for introducing the cross-linkable silicon group into the molecule of the isobutylene polymer is as follows:

A mercaptan compound having a cross-linkable silicon group represented by the formula (5):

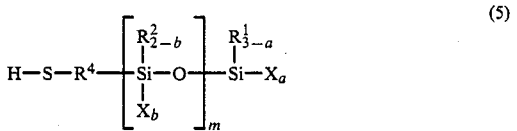

(5)

wherein $R^1$, $R^2$, a, b and m are as defined above and $R^4$ is a bivalent hydrocarbon group having 1 to 10 carbon atoms, is introduced by a radical addition reaction into the unsaturated bond in an isobutylene polymer having at least one unsaturated group (2) in the presence of a radical initiator and/or a source for generating radicals.

According to the above radical addition reaction, a polymer having the cross-linkable silicon group represented by the formula (6):

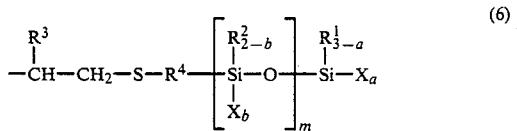

(6)

wherein $R^1$, $R^2$, $R^3$, $R^4$, a, b and m are as defined above, is obtained.

Examples of the radical initiator used in the present invention are, for instance, azo compounds such as azobisisobutyronitrile or phenylazotriphenylmethane, organic peroxides such as tert-butyl peroxide, benzoyl peroxide, and the like.

Examples of the source for generating radicals are, for instance, sun light, ultraviolet ray, X-ray, β-ray, γ-ray, and the like. In case of using the source for generating radicals, a light-sensitizer such as benzophenone or acetophenone may be used together with the above initiators or sources, as occasion demands.

It is preferable that the reaction is carried out at a temperature of 20° to 200° C. when using the radical initiator, and it is preferable that the reaction is carried out at a temperature of −20° to 200° C. when using the source for generating radicals. Also, the radical initiator can be used with the source for generating radicals.

For controlling the reaction temperature and the viscosity of the reaction system, a solvent such as n-pentane, n-hexane, n-heptane, benzene, toluene or xylene may be used as occasion demands.

As the polymer having at least one unsaturated group (2) in its molecule, the isobutylene polymer obtained according to Inifer method is preferred because of the presence of the group:

at the molecular ends. There is preferable an isobutylene polymer having the group:

at as many of the molecular ends as possible, since many cross-linkable silicon groups can be introduced at the molecular ends and the molecular ends which do not participate in the curing become fewer upon the hydrosilylation, and more preferably, an isobutylene polymer having the group:

at more than 70% of the molecular ends.

The average number of the groups:

in one molecule is preferably 1.4 to 4.5. When the number is less than 1.4, since it is difficult to introduce the cross-linkable silicon groups into all unsaturated double bonds, it may not be possible to introduce at least one cross-linkable silicon group into the molecular ends, thus resulting in unsatisfactory curing of the polymer of the present invention.

Examples of the silicon hydride compound are, for instance, halogenated silanes such as trichlorosilane, methyldichlorosilane, dimethylchlorosilane, and trimethylsiloxydichlorosilane; alkoxy silanes such as trimethoxysilane, triethoxysilane, methyldimethoxysilane, phenyldimethoxysilane, and 1,3,3,5,5,7,7-heptamethyl-1,1-dimethoxytetrasiloxane; acyloxysilanes such as methyldiacetoxysilane, and trimethylsiloxymethylacetoxysilane; ketoxymate silanes such as bis(dimethylketoxymate)methylsilane, bis(cyclohexylketoxymate)methyl silane, and bis(diethylketoxymate)trimethylsiloxysilane; hydrosilanes having at least two Si—H bonds in a molecule such as dimethylsilane, trimethylsiloxymethyl silane, 1,1,3,3-tetramethyldisiloxane, and 1,3,5-trimethylcyclotrisiloxane; alkenyloxy silanes such as methyldi(isopropenyloxy)silane; and the like, but the silicon hydride compounds are not limited thereto. Among these compounds, chlorosilanes such as trichlorosilane, methyldichlorosilane and dimethylchlorosilane are especially preferable because of high activity in the hydrosilylation. However, when the isobutylene polymer having chlorosilyl groups is obtained by the hydrosilylation using the chlorosilanes, since the obtained isobutylene polymer generates hydrogen chloride gas or hydrochloric acid while curing by condensing, there are some troubles in practical use of the polymer. Further, the generated chlorine ion functions as a catalyst in the condensation reaction of the cross-linkable silicon group, which exert a harmful effect on the storage stability of the polymer. For that reason, it is preferable that the chlorine atom of the chlorosilyl group is converted into an alkoxyl group, an acyloxyl group, an aminoxy group, an alkenyloxy group, a hydroxyl group, or the like. Among them, the alkoxyl group is especially preferred in that the hydrolyzability is adequate and handling is easy.

Examples of the mercaptan compound represented for the formula (5) are, for instance,

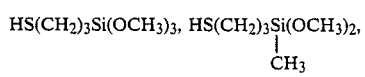

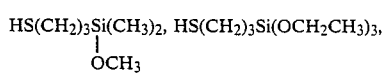

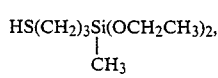

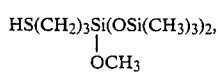

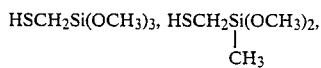

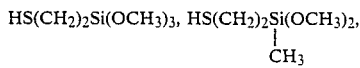

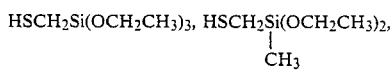

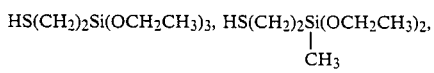

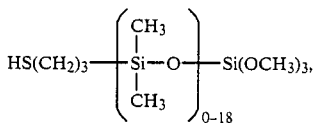

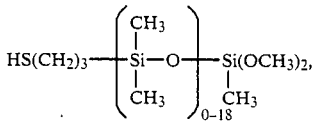

and the like, but the mercaptan compounds are not limited thereto. The cross-linkable silicon group in the mercaptan compound may be suitably converted depending on the intended use after being introduced into the isobutylene polymer.

It is preferable that the molecular weight of the isobutylene polymer having the cross-linkable silicon groups is about 500 to about 30,000. Particularly, the liquid isobutylene polymer having a molecular weight of about 1,000 to about 15,000 is more preferred in that handling is easy.

The cross-linked product of the isobutylene polymer having the cross-linkable silicon groups is excellent in weatherability, water-resistance, heat-resistance, electric isolation and gas impermeability. Particularly, when the polymer does not have an unsaturated bond other than aromatic rings in its molecule, the polymer is remarkably excellent in weatherability in comparison with the oxypropylene polymer or other organic polymers having unsaturated bonds. Also, the polymer has excellent water-resistance because of being a hydrocarbon polymers. Further, by using the isobutylene polymer of the present invention, it is possible to produce a mastic cured product in which the surface is cured and the inside is uncured. The mastic cured product has excellent adhesion to various materials. And, curable compositions having the above-mentioned properties can be obtained by employing the isobutylene polymer of the present invention.

The curable composition of the present invention may contain various silicon compounds as a modifier for widely adjusting physical properties of the cured product, e.g. strength and elongation.

Typical examples of the silicon compounds are, for instance, a silicon compound having at least one hydrolyzable group or silanol group, e.g., $(CH_3)_3SiOH$, $(CH_3CH_2)_3SiOH$, $(CH_3CH_2CH_2)_3SiOH$,

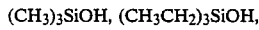

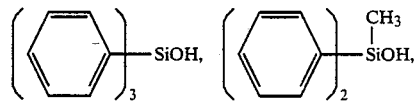

(wherein R is a hydrogen atom or a hydrocarbon group having 1 to 20 carbon atoms),

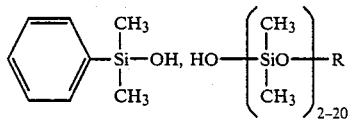

(wherein x' + y' = 1–19, and R is as defined above),

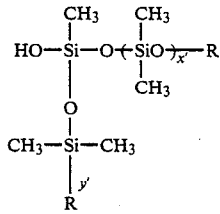

-continued
(wherein R is as defined above),

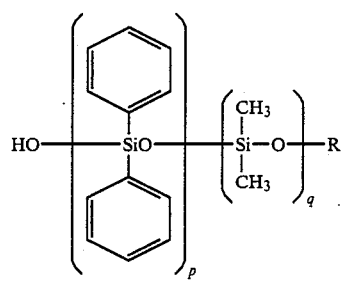

(wherein p + q = 2–20 and R is as defined above),

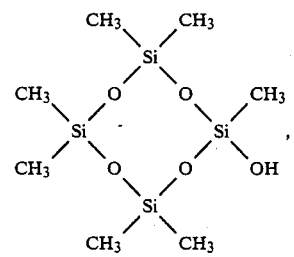

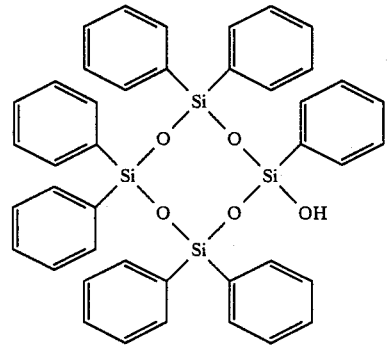

$(CH_3)_2Si(OCH_3)_2$, $(CH_3CH_2)_2Si(OCH_3)_2$,
$(CH_3)_2Si(OCH_2CH_3)_2$, $(CH_3CH_2)_2Si(OCH_2CH_3)_2$,

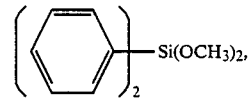

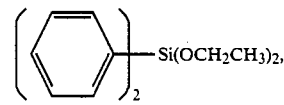

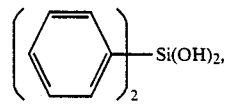

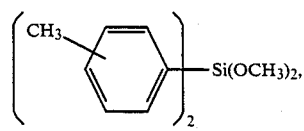

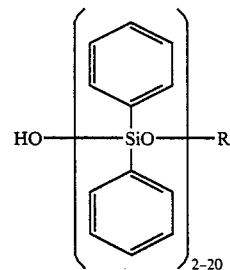

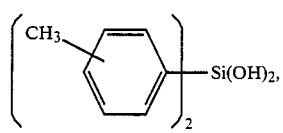
(CH₃)₂Si(OCH₂CH₂OCH₃)₂,
(CH₃CH₂)₂Si(OCH₂CH₂OCH₃)₂,
(CH₃)(CH₃CH₂)Si(OCH₃)₂,
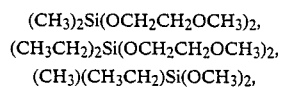
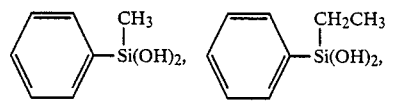
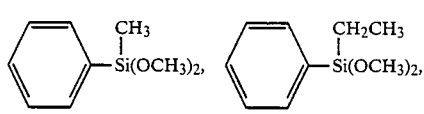
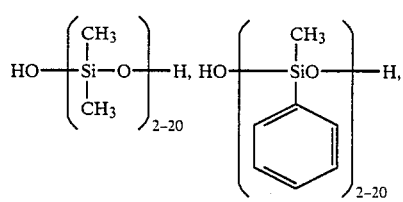
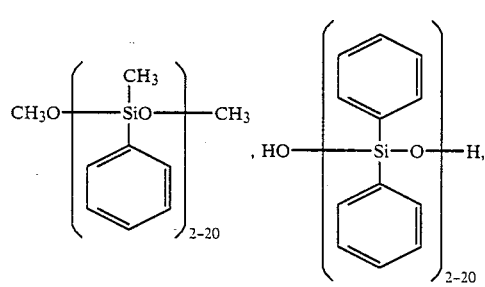
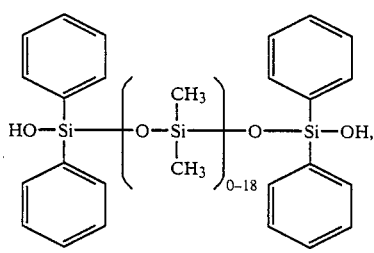
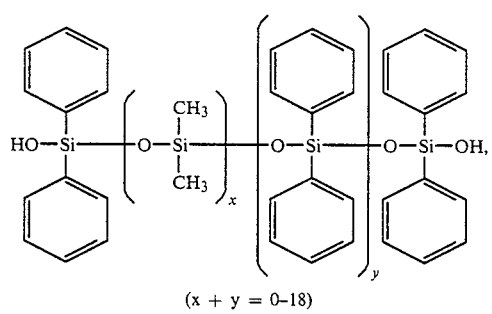
(x + y = 0-18)
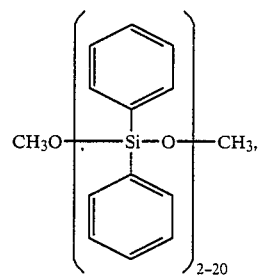
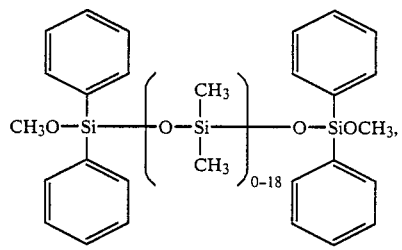
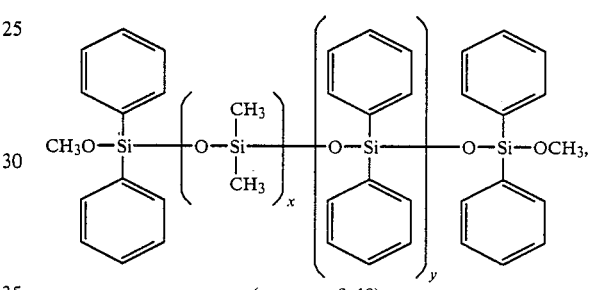
(x + y = 0-18)
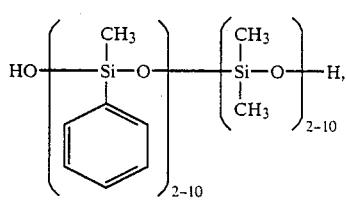
$$(CH_3)_3SiNSi(CH_3)_3,\ (CH_3)_3SiN(CH_3)_2,$$
(with H on N in first structure)
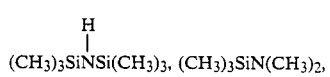
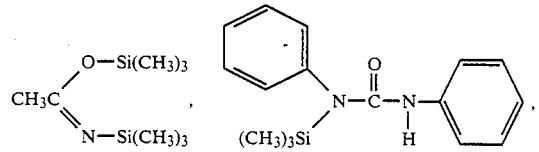
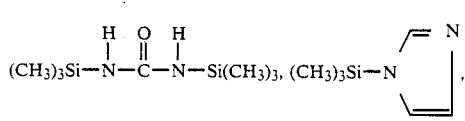
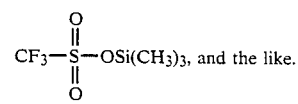
and the like.
The modifier which can be used in the present invention is not limited thereto.
As methods for adding the silicon compound, there are three methods mentioned below.

The first method is a method in which the modifier is added to the isobutylene polymer. The modifier is uniformly dispersed or dissolved in the isobutylene polymer, if necessary, with heating and stirred depending on the properties of the used silicon compound. It is not necessary to make the mixture of the modifier and polymer entirely uniform and transparent, and the object of the invention can be satisfactorily attained when it is dispersed in the polymers even if the mixture is not transparent. Further, an agent for improving the dispersiblity such as a surface active agent can be used together with the modifier as occasion demands.

The second method is a method in which the modifier is added and mixed in a predetermined amount when curing the composition. For example, when using the curable composition as a sealing material of a two-package composition, the modifier is admixed with the isobutylene polymer and a curing agent as a third component.

The third method is a method in which the modifier is previously reacted with the isobutylene polymer, if necessary, by using a tin catalyst, a titanic acid ester catalyst, an acidic or a basic catalyst. In case the modifier is a compound capable of producing a compound containing a silanol group by moisture, the reaction is carried out, adding water in a required amount under reduced pressure with heating and degasification.

Examples of the above catalyst are, for instance, a titanate such as tetrabutyl titanate or tetrapropyl titanate; a tin carbonate such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,3-diazabicyclo(5,4,6)undecene-7(DBU), and a salt thereof with a carboxylic acid; a low molecular polyamide obtained by the reaction of an excess polyamine with a polybasic acid; a reaction product of an excess polyamine with an epoxy compound; and a silane coupling agent having an amino group, e.g. a silanol condensation catalyst such as $\gamma$-aminopropyltrimethoxysilane or N-($\beta$-aminoethyl)aminopropylmethyldimethoxysilane; and the like. The catalysts may be employed alone or in admixture thereof.

Further, the curable composition of the present invention may also contain various additives, as occasion demands, e.g. fillers, plasticizers, silanol condensation catalysts which are generally used for curing the isobutylene polymers having cross-linkable silicon-containing groups; water; antioxidants, ultraviolet adsorbents, lubricants, pigments, foaming agents, tackifiers, and the like.

Examples of the filler are, for instance, wood flour, pulp, cotton, asbestos, glass fiber, carbon fiber, mica, walnut shell flour, rice hull flour, graphite, diatomaceous earth, terra alba, fumed silica, finely divided anhydrous silica, silicic dioxide, carbon black, calcium carbonate, clay, talc, titanium dioxide, magnesium carbonate, quartz, aluminum powder, flint powder, zinc powder, and the like. The fillers may be employed alone or as an admixture thereof.

Examples of the plasticizer are, for instance, a hydrocarbon compound such as a polybutene, a hydrogenated polybutene, an $\alpha$-methylstyrene oligomer, biphenyl, triphenyl, a triaryldimethane, an alkylene triphenyl, a liquid polybutadiene, a liquid hydrogenated polybutadiene, an alkyl diphenyl or a partially hydrogenated terphenyl; a chlorinated paraffin; a phthalic acid ester such as dibutyl phthalate, diheptyl phthalate, di(2-ethylhexyl)phthalate, butylbenzyl phthalate or butylphthalylbutyl glycolate; a non-aromatic dibasic acid ester such as dioctyl adipate or dioctyl sebacate; a polyalkylene glycol ester such as diethylene glycol dibenzoate or triethylene glycol dibenzoate; a phosphoric acid ester such as tricresyl phosphate or tributyl phosphate; and the like. The plasticizer may be employed alone or as an admixture thereof. Also, the plasticizer may be used instead of the solvent when introducing silicon-containing groups into the isobutylene polymer, for adjusting the reaction temperature or viscosity of the reaction system.

The silane condensation catalyst may be employed for curing the isobutylene polymer, which is the main component of the curable composition, and has crosslinkable silicon groups, as occasion demands.

Examples of the condensation catalyst are, for instance, a titanate such as tetrabutyl titanate or tetrapropyl titanate; a tin carbonate such as dibutyl tin diluarate, dibutyl tin maleate, dibutyl tin diacetate, tin octylate or tin naphthenate; a reaction product of dibutyl tin oxide with a phthalic acid ester; dibutyl tin diacetylacetonato; an organo aluminum compound such as aluminum triacetylacetonatoaluminum, tris(ethylacetoacetate)aluminum or diisopropoxyaluminum ethyl acetoacetate; a chelate compound such as zirconium tetraacetylacetonato or titanium tetraacetylacetonato; lead octylate; an amine compound such as butylamine, monoethanolamine, triethylenetetramine guanidine, 2-ethyl-4-methyl imidazole or 1,3-diazabicyclo(5,4,6)undecene-7(DBU), and a salt thereof with a carboxylic acid; and another known acidic or basic silanol condensation catalyst.

The adhesive property of the curable composition to various kinds of materials can be further improved by incorporation of one or more kinds of adhesion accelerators such as epoxy resins, phenol resins, various silane coupling agents, e.g. aminosilane compounds and epoxysilane compounds, alkyltitanates and aromatic polyisocyanates.

The polymers or the curable compositions of the invention can be suitably employed as an adhesive, a pressure sensitive adhesive tape, a paint, a sealant, a water proofing material, a spraying material, a molding material, a casting rubber material, and the like.

The present invention is more specifically described and explained by means of the following Examples and Comparative Examples in which all percentages and parts are by weight unless otherwise noted. It is to be understood that the present invention is not limited to the Examples, and various changes and modifications may be made in the invention without departing from the spirit and scope thereof.

EXAMPLE 1

A 500 ml four neck flask was charged with 20 g of an isobutylene polymer having a molecular weight of about 5,000 and having isopropenyl groups at both molecular chain ends at about 92% of the total polymer ends and 1 g of toluene and degasified under reduced pressure at 90° C. for 2 hours. To the flask, there were added 120 ml of dried heptane, 1.15 g of methyldichlorosilane and 0.1 ml of a solution of chloroplatinic acid catalyst prepared by dissolving 1 g of $H_2PtCl_6.6H_2O$ in 9 g of 1,2-dimethoxy-ethane and 1 g of ethanol under nitrogen gas atmosphere at room temperature, and the reaction was carried out at 90° C. for 12 hours.

As a result of determination of the residual isopropenyl groups of the isobutylene polymer in the reaction mixture according to infrared spectrophotometry, it was found that the isopropenyl groups hardly remained.

Then, 21.2 g of methyl orthoformate and 6.4 g of methanol were added and the mixture was reacted at 70° C. for 3 hours. The reaciton system was neutral at a pH of about 7. After a volatile component was distilled away under reduced pressure, 50 ml of hexane was added to the residue and mixed well, and then, the insoluble component was filtered off from the reaction mixture. Hexane was distilled away from the filtrate to give an isobutylene polymer having groups of the formula:

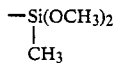

at both molecular chain ends.

According to nuclear magnetic resonance (hereinafter referred to as "NMR"), it was found that the groups:

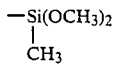

were introduced at about 80% of the molecular chain ends.

EXAMPLE 2

A 200 ml four neck flask was charged with 20 g of an isobutylene polymer having a molecular weight of about 5,000 and having isopropenyl groups at both molecular chain ends at about 92% of the total polymer ends and 1 g of toluene and degasified under reduced pressure at 90° C. for 2 hours. To the flask, there were added 5.8 ml of dried heptane and 1.88 g of γ-mercaptopropylmethyldimethoxysilane under nitrogen gas atmosphere at room temperature and the mixture was heated to 90° C. To the reaction mixture, 0.2 ml of a solution of azobisisobutyronitrile (hereinafter referred to as "AIBN") in acetone prepared by dissolving 1 g of AIBN in 5 g of acetone was added 10 times at two hour intervals. As a result of determination of the residual isopropenyl groups of the isobutylene polymer in the reaction mixture according to infrared spectrophotometry, a residual isopropenyl group proportion was about 15% of that of the starting isobutylene polymer.

Then, the solvent and unreacted silane compound in the reaction system were removed under reduced pressure at 90° C. for 2 hours to give an isobutylene polymer having groups of the formula:

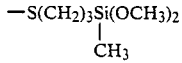

at the molecular chain ends. According to NMR, it was found that the groups:

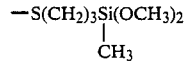

were introduced at about 75% of the molecular chain ends.

EXAMPLE 3

A 200 ml four neck flask was charged with 20 g of the isobutylene polymer used in Example 2 and degasified under reduced pressure at 90° C. for 2 hours. To the flask, there were added 20 ml of dried heptane, 1.44 g of γ-mercaptopropylmethyldimethoxysilane and 10 mg of benzophenone under nitrogen gas atmosphere. The mixture was reacted at room temperature for 40 hours by irradiating with UV lamps (commercially available under the trade name of "MIS53" made by Mitsubishi Electric Corp., 15W×2) from outside of the flask. As a result of determination of the residual isopropenyl groups of the isobutylene polymer in the reaction mixture according to infrared spectrophotometry, a residual isopropenyl group proportion was 20% of that of the starting isobutylene polymer.

Then, the solvent and unreacted silane compound in the reaction system were removed under reduced pressure to give an isobutylene polymer having the group of the formula:

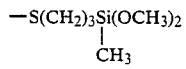

at the molecular chain ends. According to NMR, it was found that the groups:

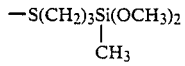

were introduced at about 70% of the molecular ends.

COMPARATIVE EXAMPLE 1

A pressure reactor equipped with a stirrer was charged with 800 g of a polypropylene oxide having an average molecular weight of 8,000 and having allyl ether groups at 97% of the whole polymer ends. To the reactor was added 19 g of methyldimethoxysilane and then 0.34 ml of a solution of chloroplatinic acid catalyst prepared by dissolving 8.9 g of $H_2PtCl_6.6H_2O$ in 18 ml of isopropyl alcohol and 160 ml of tetrahydrofuran was added, and the reaction was carried out at 80° C. for 6 hours.

As a result of determination of the residual silicon hydride (Si—H) groups by infrared spectrophotometry, it was found that the silicon hydride groups hardly remained. According to NMR, the groups of the formula:

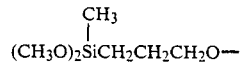

were introduced at about 85% of the molecular chain ends.

EXAMPLE 4

There were mixed 100 parts of the isobutylene polymer having the groups of the formula:

$$-\underset{\underset{\displaystyle CH_3}{|}}{Si}(OCH_3)_2$$

at the molecular ends obtained in Example 1, 50 parts of hydrogenated polybutene (commercially available under the trade name "Polybutene OH" made by Idemitsu Sekiyu Kagaku Kabushiki Kaisha) used as a plasticizer, 100 parts of a calcium carbonate treated with a fatty acid (commercially available under the trade name "CCR" made by Shiraishi Kogyo Kabushiki Kaisha) used as a filler, 2.2 parts of diphenylsilanediol used as a modifier, 0.5 part of water and 1 part of a hindered phenol antioxidant (commercially available under the trade name "Nocrac NS-6" made by Ouchi Shinko Kagaku Kabushiki Kaisha). After the mixture was kneaded sufficiently by passing through a three roller paint mill 3 times, a silanol condensation catalyst composed of 3 parts of tin octylate and 0.75 parts of laurylamine were added, which was prepared separately, and kneaded thoroughly. The composition was poured into a mold having a depth of about 3 mm while minimizing the formation of bubbles in the composition, cured at a room temperature for 4 days and aged at 50° C. for 4 days to give a cured sheet.

The obtained cured sheet was punched to give No. 3 dumbbell shaped specimens provided in Japanese Industrial Standard (JIS) K 6301, and the specimens were subjected to a tensile test (rate of tension: 500 mm/minute). The tensile strength at break was 7.4 kg/cm² and the elongation at break was 400%.

EXAMPLE 5

There were mixed 100 parts of the isobutylene polymer having the groups of the formula:

$$-\underset{\underset{\displaystyle CH_3}{|}}{Si}(OCH_3)_2$$

at the molecular chain ends obtained in Example 1, 0.5 part of water and 50 parts of toluene and the mixture was stirred sufficiently to provide a uniform mixture. The toluene solution was poured into a mold having a depth of about 3 mm and cured at room temperature for 1 day, and aged at 50° C. for 4 days. Then, toluene was completely removed by evaporating at 50° C. under a reduced pressure of 2 to 3 mmHg for 2 hours.

The weatherability of the obtained cured sheets was measured by using a sunshine weather meter for 300 hours (cycle: 120 minutes, spray: 18 minutes). The surface of the sheet was not deteriorated and the cured sheets were not resinificated and softened.

EXAMPLE 6

The heat resistance of the cured sheets obtained in Example 5 was estimated by placing the sheets in a hot air dryer of 150° C. and the sheet was observed for elapsed changes. The surface of the sheet did not change at all after 30 minutes, and further, surface tackiness was not increased, and the cured sheet was not resinificated and softened after 5 hours though a little coloring occurred on the sheet.

EXAMPLE 7

There were thoroughly mixed 100 parts of the isobutylene polymer having the groups of the formula:

$$-\underset{\underset{\displaystyle CH_3}{|}}{Si}(OCH_3)_2$$

at the molecular ends obtained in Example 1, 50 parts of Polybutene OH, 1 part of Nocrac NS-6 and 2 parts of dibutyl tin dilaurate. The mixture was poured into a frame having a depth of about 3 mm and cured at room temperature for 4 days, and aged at 70° C. for 10 days to give a cured sheet.

Cutting off the sheet, it was found that the obtained cured sheet is a mastic cured sheet in which a surface layer of about 1 mm was cured and the inside was not cured.

EXAMPLE 8

There were mixed 100 parts of the isobutylene polymer obtained in Example 2 having the groups of the formula:

$$-S(CH_2)_3\underset{\underset{\displaystyle CH_3}{|}}{Si}(OCH_3)_2,$$

50 parts of Polybutene OH, 100 parts of CCR, 2.0 parts of diphenyl silane diol, 0.5 part of water and 1 part of Nocrac NS-6. After the mixture was kneaded thoroughly by passing through a three roller paint mill 3 times, a silanol condensation catalyst composed of 3 parts of tin octylate and 0.75 part of laurylamine, which was prepared separately, was added, and the mixture was kneaded sufficiently. The composition was poured into a frame having a depth of about 3 mm while minimizing the formation of bubbles in the composition and cured at room temperature for 4 days, and aged at 50° C. for 4 days to give a cured sheet.

The obtained cured sheets were punched to give No. 3 dumbbell specimens provided in JIS K 6301, and the specimens were subjected to a tensile test (rate of tension: 500 mm/minute). The tensile strength at break was 6.0 kg/cm² and the elongation at break was 450%.

EXAMPLE 9

The procedure of Example 8 was repeated except that the polymer obtained in Example 3 was used instead of the polymer obtained in Example 2 to give a cured sheet. The cured sheet was subjected to a tensile test (rate of tension: 500 mm/minute). The tensile strength at break was 5.5 kg/cm² and the elongation at break was 420%.

EXAMPLE 10

There were mixed 100 parts of the isobutylene polymer having the groups of the formula:

$$-S(CH_2)_3\underset{\underset{\displaystyle CH_3}{|}}{Si}(OCH_3)_2$$

at the molecular ends obtained in Example 2, 0.5 part of water and 50 parts of toluene and the mixture was stirred sufficiently to provide a uniform mixture. The toluene solution was poured into a frame having a depth of about 3 mm and cured at room temperature for 1 day, and aged at 50° C. for 4 days. After, toluene was completely removed by evaporating at 50° C. under a reduced pressure of 2 to 3 mmHg for 2 hours.

The weatherability of the obtained cured sheets was measured by using the sunshine weather meter for 300 hours (cycle: 120 minutes, spray: 18 minutes). The surfaces of the sheets were not deteriorated and the cured sheets were not resinificated and softened.

EXAMPLE 11

The procedure of Example 10 was repeated except that the polymer obtained in Example 3 was used instead of the polymer obtained in Example 2 to give a cured sheet. The weatherability of the cured sheets was estimated. The surfaces of the sheets were not deteriorated and the cured sheets were not resinificated and softened at all.

EXAMPLE 12

The heat resistance of the cured sheet obtained in Example 10 was measured by using a hot air dryer of 150° C. and the elapsed changes thereof were observed. No change was observed after 30 minutes, and further, surface tackiness was not increased, and the cured sheets were not resinificated and softened at all after 5 hours though a little coloring occurred on the sheet.

EXAMPLE 13

The heat resistance of the cured sheets obtained in Example 11 was measured in the same manner as in Example 12. No change was observed after 30 minutes, and further, surface tackiness was not increased, and the cured sheets were not resinificated and softened at all after 5 hours though a little coloring occurred on the sheets.

EXAMPLE 14

There were thoroughly mixed 100 parts of the isobutylene polymer having the groups of the formula:

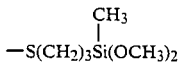

at the molecular ends obtained in Example 2, 50 parts of Polybutene OH, 1 part of Nocrac NS-6 and 2 parts of dibutyl tin dilaurate. The mixture was poured into a frame having a depth of about 3 mm, cured at room temperature for 4 days, and aged at 70° C. for 10 days to give a cured sheet.

Cutting off the sheet, it was found that the obtained cured sheet is a mastic cured sheet in which a surface layer of about 1 mm was cured and the inside was not cured.

COMPARATIVE EXAMPLE 2

The weatherability was measured in the same manner as in Example 5 except that the polymer obtained in Comparative Example 1 was used instead of the polymer obtained in Example 1. The cured sheet was softened and melted down in part after 60 hours exposure.

COMPARATIVE EXAMPLE 3

The heat resistance was measured in the same way as in Example 6 except that the cured sheet obtained in Comparative Example 2 was employed. The cured sheet was softened and melted after 30 minutes, and was decomposed after 5 hours.

In addition to the ingredients used in the Examples, other ingredients can be used in the Examples as set forth in the specification to obtain substantially the same results.

What we claim is:

1. An isobutylene polymer having an average of 1.2 to 4 silicon-containing groups at its ends, said silicon-containing groups being cross-linkable by the formation of a siloxane bond.

2. The polymer of claim 1, wherein said silicon-containing group is represented by the formula (1):

wherein $R^1$ and $R^2$ are the same or different and each is a member selected from the group consisting of an alkyl group having 1 to 20 carbon atoms, an aryl group having 6 to 20 carbon aboms, an aralkyl group having 7 to 20 carbon atoms and a triorganosiloxy group having the formula (7):

in which each $R'$ is independently a monovalent hydrocarbon group having 1 to 20 carbon atoms;

X is a hydroxyl group or a hydrolyzable group and when more than one X is present, X groups are the same or different;

a is 0, 1, 2 or 3, and b is 0, 1 or 2, provided that the sum of a and b is 1 or more; and m is 0 or an integer of 1 to 18.

3. The polymer of claim 2, wherein X is a member selected from the group consisting of a hydrogen atom, a hydroxyl group, an alkoxyl group, an acyloxy group, a ketoxymate group, an amino group, an amido group, an aminoxy group, a mercepto group and an alkenyloxy group.

4. The polymer of claim 2, wherein said X is an alkoxyl group.

5. The polymer of claim 1, wherein said silicon-containing group is represented by the formula (4):

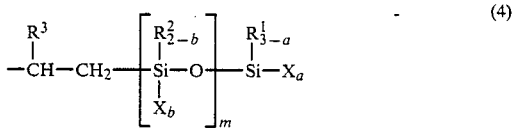

wherein $R^1$ and $R^2$ are the same or different and each is a member selected from the group consisting of an alkyl group having 1 to 20 carbon atoms, an aryl group having 6 to 20 carbon atoms, an aralkyl group having 7 to 20 carbon atoms, and a triorganosiloxy group having the formula (7):

in which each $R'$ is independently a monovalent hydrocarbon group having 1 to 20 carbon atoms;

$R^3$ is a member selected from the group consisting of a hydrogen atom, an alkyl group having 1 to 8 carbon atoms, an aryl group having 6 to 20 carbon atoms, and aralkyl group having 7 to 20 carbon atoms;

X is a hydroxyl group or a hydrolyzable group and when more than one X is present, the X groups are the same or different;

a is 0, 1, 2 or 3, and b is 0, 1 or 2, provided that the sum of a and b is 1 or more; and m is 0 or a integer of 1 to 18.

6. The polymer of claim 5, wherein said $R^3$ is a methyl group.

7. The polymer of claim 1, wherein said silicon-containing group is represented by the formula (6):

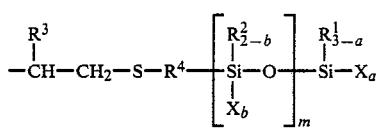

(6)

wherein $R^1$ and $R^2$ are the same or different and each is a member selected from the group consisting of an alkyl group having 1 to 20 carbon atoms, an aryl group having 6 to 20 carbon atoms, an aralkyl group having 7 to 20 carbon atoms, and a triorganosiloxy group having the formula (7):

(7)

in which each R' is independently a monovalent hydrocarbon group having 1 to 20 carbon atoms;

$R^3$ is a member selected from the group consisting of a hydrogen atom, an alkyl group having 1 to 8 carbon atoms, an aryl group having 6 to 20 carbon atoms, and an aralkyl group having 7 to 20 carbon atoms;

$R^4$ is a bivalent hydrocarbon group having 1 to 10 carbon atoms;

X is a hydroxyl group or a hydrolyzable group and when more than one X is present, the X groups are the same or different;

a is 0, 1, 2 or 3, and b is 0, 1 or 2, provided that the sum of a and b is 1 or more; and m is 0 or an integer of 1 to 18.

8. The polymer of claim 7, wherein $R^3$ is methyl group.

9. The polymer of claim 1, which is obtained by a hydrosilylation of an isobutylene polymer having, at the molecular ends, at least one unsaturated group represented by the formula (2):

(2)

wherein $R^3$ is a member selected from the group consisting of a hydrogen atom, an alkyl group having 1 to 8 carbon atoms, an aryl group having 6 to 20 carbon atoms and an aralkyl group having 7 to 20 carbon atoms, and a hydrosilane represented by the formula (3):

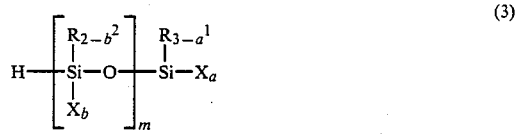

(3)

wherein $R^1$ and $R^2$ are the same or different and each is a member selected from the group consisting of an alkyl group having 1 to 20 carbon atoms, an aryl group having 6 to 20 carbon atoms, an aralkyl group having 7 to 20 carbon atoms, and a triorganosiloxy group having the formula (7):

(7)

in which each R' is independently a monovalent hydrocarbon group having 1 to 20 carbon atoms;

X is a hydroxyl group or a hydrolyzable group and when more than one X is present, the X groups are the same or different;

a is 0, 1, 2 or 3, b is 0, 1 or 2, provided that the sum of a and b is 1 or more; and m is 0 or a integer of 1 to 18.

10. The polymer of claim 1, which is obtained by a radical addition reaction, in the presence of a source for generating a radical, of an isobutylene polymer having, at the molecular ends, at least one unsaturated group represented by the formula (2):

(2)

wherein $R^3$ is a member selected from the group consisting of hydrogen atom, an alkyl group having 1 to 8 carbon atoms, an aryl group having 6 to 20 carbon atoms and an aralkyl group having 7 to 20 carbon atoms, and a mercaptan compound represented by the formula (5):

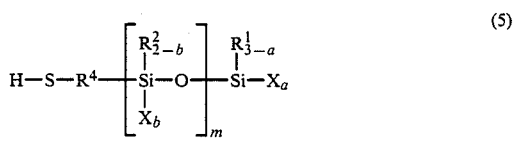

(5)

wherein $R^1$ and $R^2$ are the same or different and each is a member selected from the group consisting of an alkyl group having 1 to 20 carbon atoms, an aryl group having 6 to 20 carbon atoms, an aralkyl group having 7 to 20 carbon atoms, and a triorganosiloxy group having the formula (7):

(7)

in which each R' is independently a monovalent hydrocarbon group having 1 to 20 carbon atoms;

$R^4$ is a hydrocarbon group having 1 to 10 carbon atoms;

X is a hydroxyl group or a hydrolyzable group and when more than one X is present, the X groups are the same or different;

a is 0, 1, 2 or 3, and b is 0, 1 or 2, provided that the sum of a and b is 1 or more; and m is 0 or an integer of 1 to 18.

11. A composition containing silanol condensation catalysts and an isobutylene polymer having an average of 1.2 to 4 silicon-containing groups at its ends, said silicon-containing groups being cross-linkable by the formation of a siloxane bond.

12. A cured product of an isobutylene polymer having an average of 1.2 to 4 silicon-containing groups at its ends, said silicone-containing groups being cross-linked by the formation of a siloxane bond.

* * * * *